United States Patent
Johnson et al.

(10) Patent No.: US 10,515,519 B2
(45) Date of Patent: Dec. 24, 2019

(54) AUTOMATED TESTING SYSTEMS AND METHODS FOR POINT-OF-SALE TERMINALS

(71) Applicant: Walmart Apollo, LLC, Bentonville, AR (US)

(72) Inventors: Christopher D. Johnson, Bentonville, AR (US); Timothy M. Fenton, Bentonville, AR (US); Michael A. Ryan, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/198,056

(22) Filed: Nov. 21, 2018

(65) Prior Publication Data

US 2019/0156638 A1    May 23, 2019

Related U.S. Application Data (60) Provisional application No. 62/589,970, filed on Nov. 22, 2017.

(51) Int. Cl.
*G06Q 20/20* (2012.01)
*G07G 1/00* (2006.01)
(Continued)

(52) U.S. Cl.
CPC ......... *G07G 1/0045* (2013.01); *G06Q 20/202* (2013.01); *G06Q 20/208* (2013.01);
(Continued)

(58) Field of Classification Search
CPC ... G06Q 20/202; G06Q 20/208; G06Q 20/209
See application file for complete search history.

(56) References Cited

U.S. PATENT DOCUMENTS

| | | |
|---|---|---|
| 5,438,186 A | 8/1995 | Nair |
| 5,577,197 A | 11/1996 | Beck |
| (Continued) | | |

FOREIGN PATENT DOCUMENTS

| | | |
|---|---|---|
| CA | 2763886 | 4/2012 |
| CN | 103679970 | 3/2014 |
| (Continued) | | |

OTHER PUBLICATIONS

"Free Online Barcode Generator: Create Barcodes for Free!"; http://barcode.tecit.com/en; printed Apr. 28, 2016; pp. 1-2.
(Continued)

*Primary Examiner* — A. Hunter Wilder
(74) *Attorney, Agent, or Firm* — Fitch, Even, Tabin & Flannery LLP (57) ABSTRACT

In some embodiments, apparatuses and methods are provided herein useful to automating testing of transactions at a point-of-sale (POS) terminal. In some embodiments, a system comprises a handheld scanner including an electronic switch electrically coupled to a physical trigger of the handheld scanner, wherein the handheld scanner is configured to read a product identifier, a first display device configured to present the product identifier, the POS terminal including a second display device configured to present a transaction record for a transaction, and a control circuit configured to determine a test case to execute, determine the product identifier, cause presentation of the product identifier, transmit a signal that mimics a pull of the trigger, capture, from the second display device, an image including at least a portion of the transaction record, and analyze the image to determine whether the transaction record includes a record associated with the product identifier.

12 Claims, 3 Drawing Sheets

(51) Int. Cl.
*G07G 1/14* (2006.01)
*G06K 9/20* (2006.01)

(52) U.S. Cl.
CPC ............. *G07G 1/0009* (2013.01); *G07G 1/14* (2013.01); *G06K 9/20* (2013.01); *G06K 2209/01* (2013.01)

(56) References Cited

U.S. PATENT DOCUMENTS

| | | | |
|---|---|---|---|
| 5,760,383 | A | 6/1998 | Heske, III |
| 6,719,199 | B1 | 4/2004 | Cotten |
| 6,785,845 | B2 | 8/2004 | Venkataraman |
| 6,793,141 | B1 | 9/2004 | Graham |
| 6,978,930 | B2 | 12/2005 | Harding |
| 7,156,292 | B2 | 1/2007 | Silverbrook |
| 7,613,634 | B2 | 11/2009 | Siegel |
| 8,132,713 | B2 | 3/2012 | Kekicheff et al. |
| 8,329,051 | B2 | 12/2012 | Fu |
| 8,376,239 | B1 | 2/2013 | Humphrey |
| 8,453,931 | B2 | 6/2013 | Chiou |
| 8,944,332 | B2 | 2/2015 | Harding |
| 8,955,752 | B2 | 2/2015 | Chiou |
| 9,569,765 | B2 | 2/2017 | Cancro |
| 9,607,201 | B1 | 3/2017 | Schafer |
| 2001/0034623 | A1 | 10/2001 | Chung |
| 2002/0092914 | A1 | 7/2002 | Pentz |
| 2004/0060984 | A1 | 4/2004 | Connelly |
| 2005/0127173 | A1 | 6/2005 | Idol, Jr. |
| 2005/0274801 | A1 | 12/2005 | Harding |
| 2007/0284449 | A1 | 12/2007 | Yuen |
| 2008/0105749 | A1 | 5/2008 | Lei |
| 2011/0073647 | A1* | 3/2011 | Chiou ............... G06K 7/10544 235/437 |
| 2016/0034723 | A1 | 2/2016 | Somani |
| 2016/0203456 | A1 | 7/2016 | Herring |

FOREIGN PATENT DOCUMENTS

| | | |
|---|---|---|
| CN | 105321269 | 2/2016 |
| CN | 206311714 | 7/2017 |
| CN | 107169387 A * | 9/2017 |
| JP | H2297721 A | 12/1990 |
| WO | 1999028851 | 6/1999 |
| WO | 2014056118 | 4/2014 |

OTHER PUBLICATIONS

Abrantix AG; "EFTPOS Card and PIN Robot for Automated Testing"; https://www.youtube.com/watch?v=SAwMnx8Vdb8; published Mar. 21, 2016; pp. 1-6.

Demaitre, Eugene; "POS Testing Goes Robotic With Rhiscom Automaton"; Robotic Business Review; published Apr. 28, 2016; pp. 1-6.

Grupohdi; "Testing POS Using Robotics"; https://www.youtube.com/watch?v=2RCDO64ZuJ8; published Apr. 3, 2013; pp. 1-4.

PCT; App. No. PCT/US17/67499; International Search Report and Written Opinion dated Mar. 8, 2018.

PCT; App. No. PCT/US2018/061413; International Search Report dated Jan. 25, 2019.

UL Transaction Security; "UL Terminal Test Station"; https://www.youtube.com/watch?v=23a9iavWH3o; published on Sep. 2, 2016; pp. 1-5.

PCT; App. No. PCT/US2018/061988; International Search Report and Written Opinion dated Feb. 21, 2019.

* cited by examiner

AUTOMATED TESTING SYSTEMS AND METHODS FOR POINT-OF-SALE TERMINALS

CROSS-REFERENCE TO RELATED APPLICATION

This application claims the benefit of U.S. Provisional Application No. 62/589,970, filed Nov. 22, 2017, which is incorporated by reference in its entirety herein.

TECHNICAL FIELD

This invention relates generally to automated testing systems and, more particularly, to automated testing systems for point-of-sale (POS) terminals.

BACKGROUND

Point-of-sale (POS) terminals are complex systems that can include multiple hardware peripherals and software applications. For example, a POS terminal may include a primary computer coupled to a display device, a stationary scanning mechanism, a handheld scanner, a card reader, and a printer, as well as multiple backend systems. Each of these hardware peripherals, as well as the software employed by the hardware peripherals, may be provided by different entities. Consequently, it can be difficult to ensure that the POS terminal will work seamlessly, with few or no errors.

Customers expect a smooth shopping experience and may become frustrated when problems arise at checkout. Specifically, POS terminal errors may cause long lines and delays. Accordingly, it is desirable to ensure that a POS terminal is functioning properly before it is used for real transactions. Due to the number of different transaction types and differing requirements for each transaction type, it can be time consuming, and costly, to test the POS terminal and the associated peripherals and software. Consequently, a need exists for an automated system to test POS terminals.

BRIEF DESCRIPTION OF THE DRAWINGS

Disclosed herein are embodiments of systems, apparatuses, and methods pertaining to automated testing of transactions at a point-of-sale (POS) terminal. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to automated testing of transaction at a point-of-sale (POS) terminal. In some embodiments, a system comprises a handheld scanner, wherein the handheld scanner includes an electronic switch, wherein the electronic switch is electrically coupled to a physical trigger of the handheld scanner, and wherein the handheld scanner is configured to read a product identifier, a first display device, wherein the first display device is configured to present the product identifier, the POS terminal wherein the POS terminal includes a second display device, wherein the second display device is configured to present a transaction record for a transaction at the POS terminal, and a control circuit, wherein the control circuit is communicatively coupled to the handheld scanner, the first display device, and the second display device, wherein the control circuit is configured to determine a test case to execute, determine, based on the test case to execute, the product identifier, cause presentation, on the first display device, of the product identifier, transmit, to the electronic switch, a signal, wherein the signal mimics a pull of the trigger and causes the handheld scanner to read the product identifier, capture, from the second display device, an image, wherein the image includes at least a portion of the transaction record, and analyze the image to determine whether the transaction record includes a record associated with the product identifier.

As previously discussed, point-of-sale (POS) terminals are a piece of a complex system used for retail transactions. The system as a whole may comprise the POS terminal as well as many other peripheral devices, such as scanner, printers, display devices, card readers, etc. Because customers expect the checkout procedure to be quick and simple, it is important to test POS terminals, as well as the system as a whole, before use in a retail environment. Testing the POS terminals before use in the retail environment can help eliminate errors during use. Because these errors can result in delays and long lines, minimizing the occurrence of errors is important for customer satisfaction and retailer profits.

While testing POS terminals and associated systems has many benefits, it can also be quite costly and time consuming. That is, manually testing each type of transaction requires a significant expenditure of time and money. Embodiments of the inventive subject matter seek to minimize the costs and time associated with testing POS terminals and the associated systems by automating testing of the POS terminals and the associated systems. Specifically, as described herein, embodiments describe systems, methods, and apparatuses for testing scanners associated with a POS terminal in an automated manner. While this disclosure relates specifically to testing handheld scanners, similar approaches can be applied to all types of scanners. Additionally, variations of the described systems, methods, and apparatuses can be used to test other peripheral devices, such as printers, card readers, etc. For example, the systems, methods, and apparatuses disclosed herein can be modified to test a magnetic card reader, as described in a U.S. Provisional Patent Application No. 62/590,009 titled "Test Card for Automated Retail Financial Transaction System,"

naming as inventors Christopher Johnson and Michael Ryan and filed on Nov. 22, 2017, incorporated herein by reference. Additionally, the systems, methods, and apparatuses described herein can be used with automated testing systems, such as those described in U.S. Provisional Patent Application No. 62/438,506 titled "Retail Financial System Testing Systems and Methods, filed Dec. 23, 2016, incorporated herein by reference.

Generally speaking, the systems, methods, and apparatuses described herein include a test system and a POS terminal. The test system selects a test case (e.g., a general merchandise transaction) and a product identifier (e.g., a barcode) associated with an item for the test case. The test system presents the product identifier and triggers a scan of the product identifier by a handheld scanner. The handheld scanner is communicatively coupled to the POS terminal and transmits an indication of the product identifier to the POS terminal. After receipt of the indication of the product identifier from the handheld scanner, the POS terminal updates a transaction record to include a record associated with the product identifier (e.g., a line item within the transaction record). The POS terminal presents the updated transaction record on a display device (i.e., a display device associated with the POS terminal). The test system then analyzes the transaction record to ensure that the transaction record correctly reflects the scan of the product identifier. The discussion of FIG. 1 provides an overview of an automated testing system for a POS terminal and an associated handheld scanner.

Figure 1:
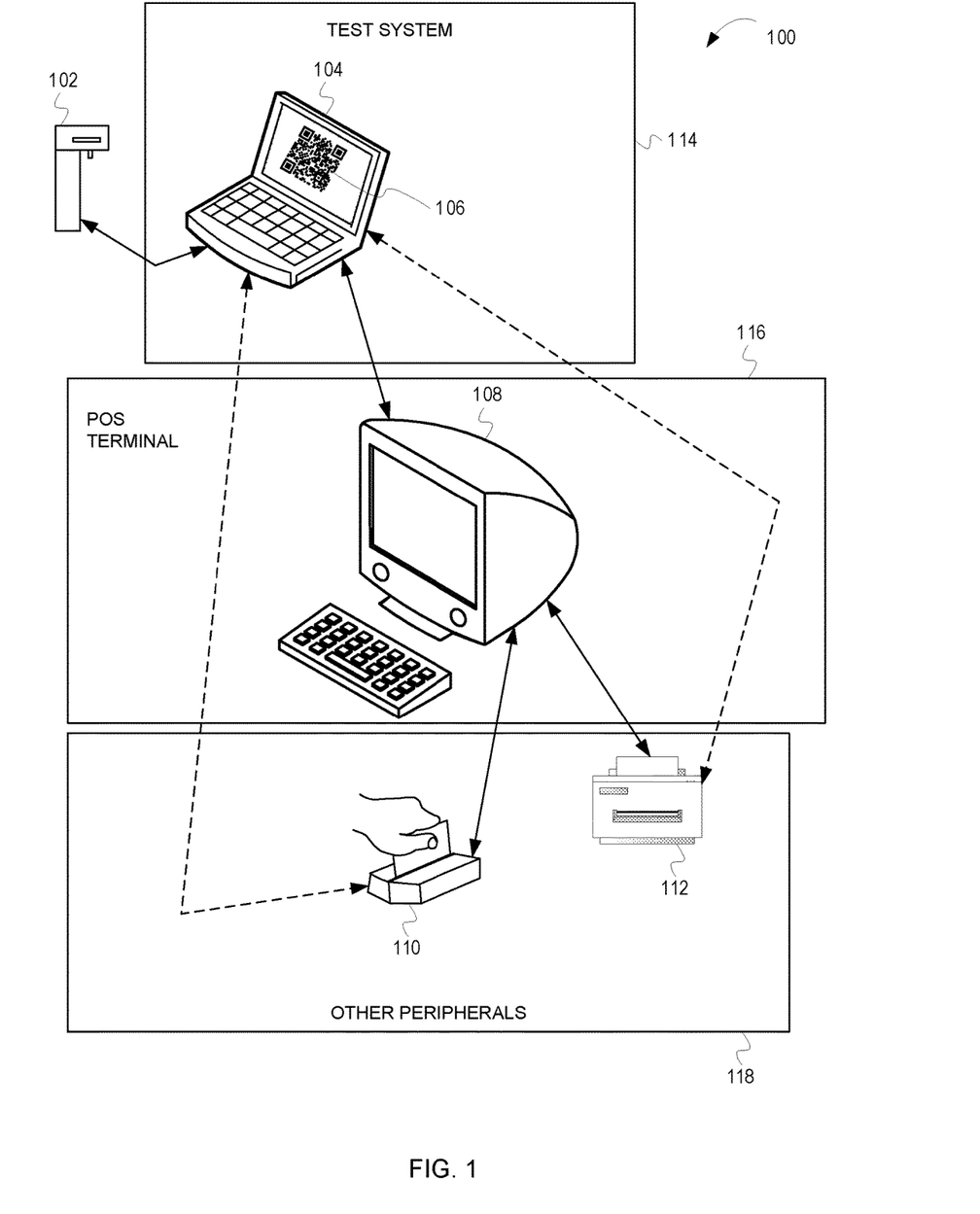
FIG. 1 depicts a system 100 for automated testing of financial transactions, according to some embodiments.

FIG. 1 depicts a system 100 for automated testing of financial transactions, according to some embodiments. The system 100 includes a test system 114, a POS terminal 116, and other peripherals 118. The other peripherals include a card reader 110 and a printer 112, though other peripherals not pictured in FIG. 1 can be included. The other peripherals 118 can be communicatively coupled to a test computer 104 (as indicated by the dashed lines). Specifically, one or more of the other peripherals 118 will be communicatively coupled to the test computer 104 if one of the other peripherals 118 is being tested. It should be noted that the other peripherals 118 are depicted for clarity, and may not be required for automated testing of a handheld scanner 102. Although not depicted as being included in the "other peripherals," 118, the handheld scanner 102 is also a peripheral. The handheld scanner 102 is not included with "other peripherals" 118 in FIG. 1 because the interaction between the handheld scanner 102 and the POS terminal 116 is being tested in the example depicted in FIG. 1.

The POS terminal 116 includes a computer 108. The computer 108 can be any device suitable to perform financial transactions and includes a display device. In some embodiments, the POS terminal 116 is a standard POS terminal 116 that would be used in a retail facility. In other embodiments, the POS terminal 116 may be a standard POS terminal 116 that is modified for test use, or a POS terminal 116 designed specifically for test use. In either case, the POS terminal 116 is communicatively coupled to the other peripherals 118 and the handheld scanner 102. Accordingly, the POS terminal 116 can receive input from, and in some cases provide output to, the other peripherals 118 and/or the handheld scanner 102. For example, the POS terminal 116 can receive input from the handheld scanner 102 in the form of indications of product identifiers.

The test system 114 includes a test computer 104. The test computer 104 can be a standard device or a device that has been modified, or designed specifically, for testing purposes. Although depicted simply as a laptop in FIG. 1, the test computer 104 can include additional input and/or output devices to facilitate automated testing of the POS terminal 116. The test computer 104 is configured to select test cases. The test cases are related to retail financial transactions. For example, the test case can include a general merchandise item, an age restricted item, an item for which a service contract is associated, a linked transaction, a coupon transaction, or any other suitable transaction type. Dependent upon the test case selected, the POS terminal 116 may have differing responses and/or actions. For example, a general merchandise transaction may only require the POS terminal 116 to update a transaction record to include a record associated with a scanned product identifier. As another example, an age restricted item may require the POS terminal 116 to not only update the transaction record, but also present a prompt to an employee to verify the customer's age.

After the test case is selected, the test computer 104 determines a product identifier 106. Again, returning to the general merchandise example, the test computer 104 selects a product identifier 106 associated with a general merchandise item. The test computer 104 presents the product identifier 106 via a display device. The handheld scanner 102 reads the product identifier 106 from the display device. The product identifier 106 can be of any suitable type, such as a barcode, a two-dimensional barcode, an alphabetic, numeric or alphanumeric code, a symbol, etc. The type of the product identifier 106 can be chosen based on the test case to execute. For example, the test case may be for a linked transaction based on a two-dimensional barcode scan. In this example, a two-dimensional barcode for a linked transaction would be chosen as the product identifier 106. Because the handheld scanner 102 reads the product identifier 106 from the display device, it is preferred that the display device is of a type that minimally susceptible to glare, though any suitable type of display device can be utilized.

After reading the product identifier 106, the handheld scanner 102 transmits an indication of the product identifier to the POS terminal 116. The POS terminal 116 updates the transaction record based on the indication of the product identifier. If the specific test case requires additional action by the POS terminal 116, the POS terminal 116 performs the additional action. For example, in the case of a linked transaction, the POS terminal 116 will update the transaction record to include a record associated with linked items.

After transmitting the signal to the handheld scanner 102, the test computer 104 verifies that the POS terminal 116 updated the transaction record correctly. For example, in a general merchandise transaction, the test computer 104 verifies that the POS terminal 116 updated the transaction record to include a record associated with the product identifier 106. In some embodiments, the test computer 104 verifies that the POS terminal 116 updated the transaction record correctly by analyzing an image presented on a display device of the POS terminal 116. In such embodiments, the test computer 104 is communicatively coupled to the POS terminal 116 and/or the display device associated with the POS terminal 116. The test computer 104 can capture, from the display device associated with the POS terminal 116, the image. The image can include the entire transaction record, or just a portion of the transaction record. The test computer 104 analyzes the captured image to determine if the transaction record includes a record associated with the product identifier 106 (or any other information or dialogue required by the test case). In some embodiments, the test computer 104 utilizes optical character recognition (OCR) and/or image recognition to analyze the captured image. If the test computer 104 determines that POS terminal 116 responded to the indication of the product identifier 106 correctly (e.g., that the transaction record includes a record associated with the product identifier 106), the test computer 104 can log an indication of success in a database (i.e., an indication that the POS terminal 116 correctly responded to the indication of the product identifier 106 associated received from the handheld scanner 102).

If the analysis indicates that the POS terminal 116 did not correctly respond to the received indication of the product identifier 106, the test computer 104 can perform additional steps. In some embodiments, the test computer 104 can perform these additional steps in a specified order. For example, as a first step, the test computer 104 can again transmit (i.e., retransmit) the signal to the handheld scanner 102. The test computer 104 can perform this step any number of times. For example, the test computer 104 can attempt to rescan the product identifier 106 three times. If the POS terminal 116 has not correctly responded to the indication of the product identifier 106 after the allotted number of attempts, the test computer 104 can attempt to cash out the transaction, void the transaction, and/or cause the POS terminal 116 to reboot. The test computer 104 can cause one or more of these steps to be performed in any suitable order. For example, if the POS terminal 116 is unable to cash out the transaction, the test computer 104 can attempt to cause the POS terminal 116 to void the transaction. If the POS terminal 116 is unable to void the transaction, the test computer 104 can attempt to cause the POS terminal 116 to reboot.

Figure 2:
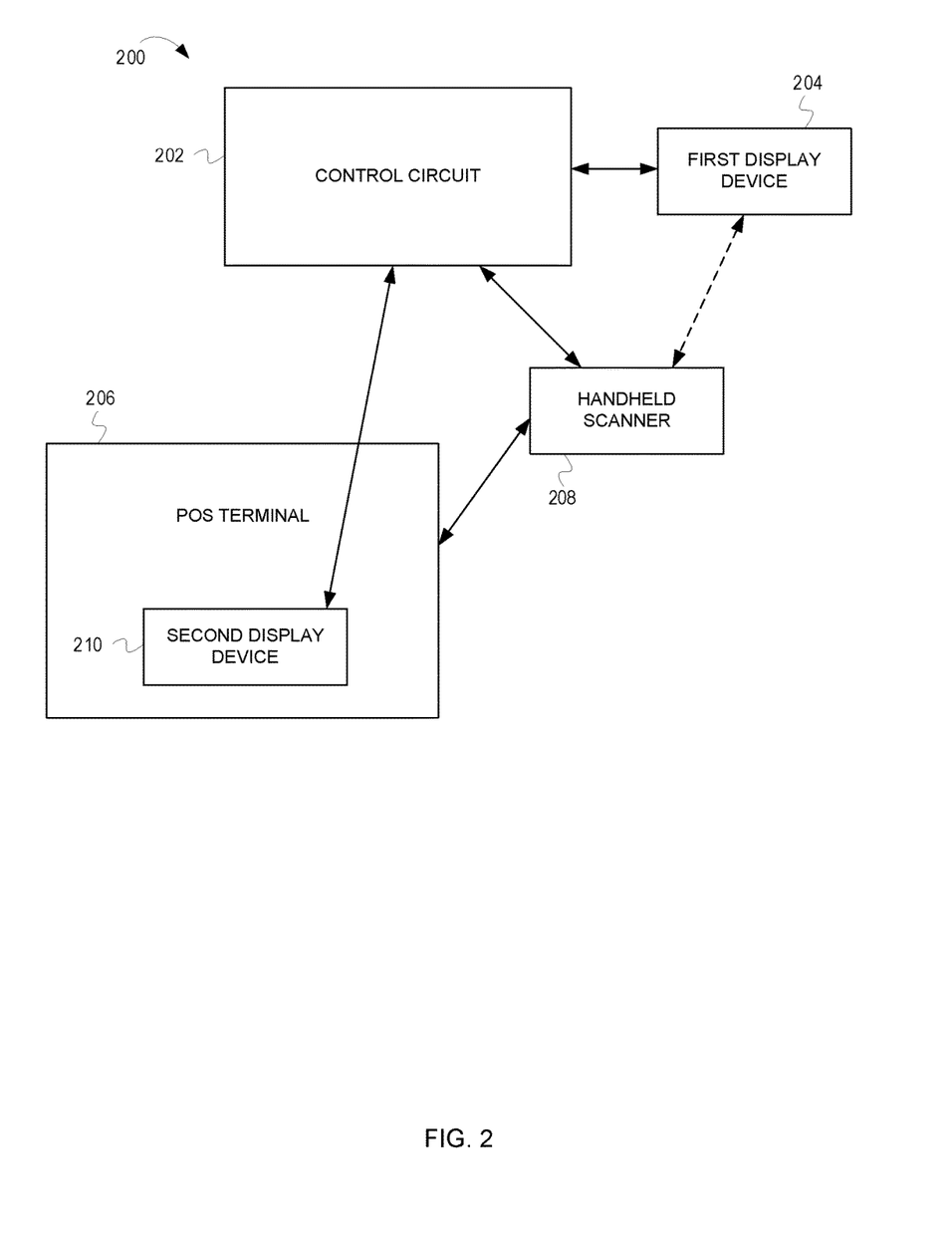
FIG. 2 is a block diagram of a system 200 for automated testing of financial transactions, according to some embodiments.

While the discussion of FIG. 1 provides background information regarding a system for automated testing of a POS terminal, the discussion of FIG. 2 provides additional detail regarding such a system.

FIG. 2 is a block diagram of a system 200 for automated testing of financial transactions, according to some embodiments. The system 200 includes a control circuit 202, a first display device 204, a POS terminal 206, and a handheld scanner 208. The POS terminal includes an associated second display device 210.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 202 is communicatively coupled to the first display device 204. After determining a product identifier based on a selected test case, the control circuit 202 transmits the product identifier to the first display device 204. The first display device 204 presents the product identifier for reading by the handheld scanner (as indicated by the dashed line). The handheld scanner 208 is also communicatively coupled to the control circuit 202. The handheld scanner 208 receives a signal from the control circuit 202. The signal mimics a trigger pull of the handheld scanner 208 and causes the handheld scanner 208 to read the product identifier from the first display device 204. In some embodiments, the handheld scanner 208 is modified to accept the signal from the control circuit 202. For example, the handheld scanner 208 can be modified to include an electronic switch, such as a transistor, integrated into the circuitry of the handheld scanner 208. In such embodiments, the signal from the control circuit 202 can be an electrical pulse which closes the electronic switch (e.g., allow current to flow between the source and the drain of the transistor), simulating a trigger pull of the handheld scanner 208. Because trigger pulls of the handheld scanner 208 can be simulated by the control circuit 202, it is not necessary for mechanical manipulation of the handheld scanner 208, allowing for simplified automated testing.

After reading the product identifier, the handheld scanner 208 transmits an indication of the product identifier to the POS terminal 206. The POS terminal 206 responds to the received indication of the product identifier. The POS terminal's 206 response is dependent upon the product identifier (i.e., the test case). For example, for a general merchandise transaction, the POS terminal 206 may simply update a transaction record to include a record associated with the product identifier. For a more complicated test case, the POS terminal 206 may perform additional actions, such as prompting an employee to verify the customer's age, offering the customer a service contract, etc. For appropriate actions, the POS terminal 206 presents information via the second display device 210.

The control circuit 202 is also communicatively coupled to the second display device 210. In some embodiments, the control circuit 202 can be communicatively coupled to the second display device 210 via the POS terminal 206. That is, the control circuit 202 is communicatively coupled to the POS terminal 206 and the POS terminal is communicatively coupled to the second display device 210. The control circuit 202 verifies that the product identifier was properly read by the handheld scanner 208 and/or that the POS terminal 206 has responded properly to the indication of the product identifier by analyzing the information presented by the POS terminal 206 via the second display device 210. In some embodiments, the control circuit 202 captures an image from the second display device 210. In such embodiments, the control circuit 202 verifies that the product identifier was properly read by the handheld scanner 208 and/or that the POS terminal 206 responded properly to the indication of the product identifier by analyzing the captured image. The analysis can comprise OCR and/or image recognition. Using such techniques, the control circuit 202 verifies that POS terminal 206 responded properly to the indication of the product identifier by searching for a record associated with the product identifier, and other information when appropriate, is included in the captured image.

Figure 3:
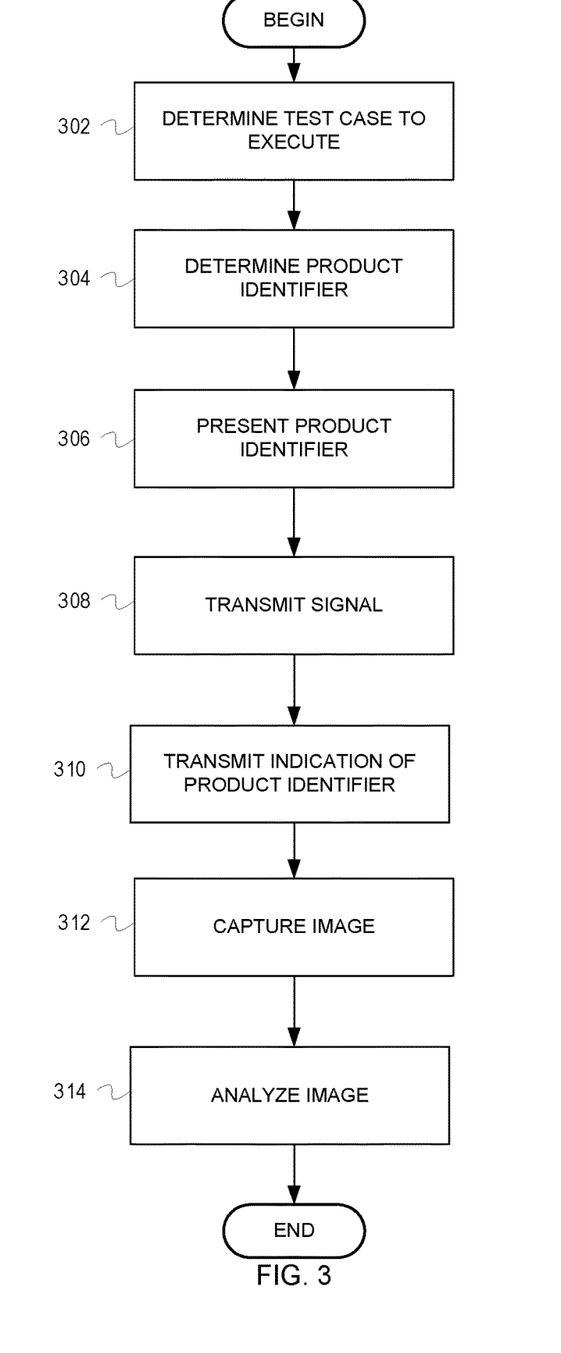
FIG. 3 is a flow chart depicting example operations for automated testing of financial transactions, according to some embodiments.

While the discussion of FIG. 2 provides additional detail regarding a system for automated testing of a POS terminal, the discussion of FIG. 3 describes example operations for automated testing of a POS terminal.

FIG. 3 is a flow chart depicting example operations for automated testing of financial transactions, according to some embodiments. The flow begins at block 302.

At block 302, a test case to execute is determined. For example, a control circuit of a test system can determine the test case to execute. The control circuit can select the test case to execute in any suitable manner. For example, the control circuit can randomly select test cases to execute or select test cases to executed in a predetermined or programmed manner. The test case can include a general merchandise item, an age restricted item, an item for which a service contract is associated, a linked transaction, a coupon transaction, or any other suitable transaction type. Additionally, the test case can be based on a type of product identifier to be tested. For example, the test case can be used to determine a handheld scanner's ability to read an alphanumeric code. The flow continues at block 304.

At block 304, a product identifier is determined. For example, the control circuit can determine the product identifier. The control circuit can determine the product identifier based on the test case to be executed. For example, the control circuit can select the product identifier based on the type of transaction to be tested and/or the type of product identifier to be tested. The flow continues at block 306.

At block 306, the product identifier is presented. For example, a display device associated with the test system can present the product identifier to the handheld scanner. The flow continues at block 308.

At block 308, a signal is transmitted. For example, the control circuit can transmit the signal to the handheld scanner. The signal mimics the pull of a trigger of the handheld scanner and causes the handheld scanner to read the product identifier. In some embodiments, the handheld scanner is modified to include an electronic switch. The electronic switch is coupled to the circuitry of the handheld scanner. Upon receipt of the signal, the electronic switch is closed, simulating a trigger pull of the handheld scanner. Because trigger pulls of the handheld scanner can be simulated by the control circuit, it is not necessary for mechanical manipulation of the handheld scanner, allowing for simplified automated testing. The flow continues at block 310.

At block 310, an indication of the product identifier is transmitted. For example, the handheld scanner can transmit the indication of the product identifier to a POS terminal. The handheld scanner can transmit the indication of the product identifier to the handheld scanner wirelessly or via wired means. The indication of the product identifier causes the POS terminal to perform an action. The action that the POS terminal performs is based on the test case. For example, for a coupon transaction, the POS terminal will update a transaction record to include a record associated with the coupon and/or decreases the total price of the transaction in the transaction record. The POS terminal presents the transaction record as it is updated. For example, the POS terminal can present the transaction record via a display device associated with the POS terminal. The flow continues at block 312.

At block 312, an image is captured. For example, the control circuit can cause an image to be captured of the display device associated with the POS terminal. The image includes at least a portion of the transaction record presented by the display device associated with the POS terminal. The flow continues at block 314.

At block 314, the image is analyzed. For example, the control circuit analyzes the image captured from the display device associated with the POS terminal. The control circuit analyzes the captured image to determine if the transaction record includes a record associated with the product identifier. The record associated with the product identifier can be, dependent upon the test case, a line item in the transaction record and/or other information, such as a dialogue box, a user input presentation, a questionnaire, an employee prompt, a total price of the transaction, etc. If the test case includes multiple items for which to check, the control circuit can cause multiple images to be captured. For example, if the test case requires the POS terminal to add a line item to the transaction record and prompt the employee to verify the customer's age, the control circuit can capture an image of the prompt as well as the transaction record. Accordingly, the control circuit can analyze both of the images. In some embodiments, the control circuit analyzes the captured image using OCR and/or image recognition.

As previously discussed, the systems, methods, and apparatuses described herein can be modified to test other portions of a POS terminal and the associated systems. For example, to test a card reader, inputs at the card reader can be transmitted to the POS terminal. The test system can then analyze the transaction record presented by the POS terminal to verify that the card reader correctly received the input and/or that the POS terminal correctly responded to the input received at the card reader. Similarly, the systems, methods, and apparatuses described herein can be modified to test any other functionality of the POS terminal and/or peripheral devices.

In some embodiments, a system comprises a handheld scanner, wherein the handheld scanner includes an electronic switch, wherein the electronic switch is electrically coupled to a physical trigger of the handheld scanner, and wherein the handheld scanner is configured to read a product identifier, a first display device, wherein the first display device is configured to present the product identifier, the POS terminal wherein the POS terminal includes a second display device, wherein the second display device is configured to present a transaction record for a transaction at the POS terminal, and a control circuit, wherein the control circuit is communicatively coupled to the handheld scanner, the first display device, and the second display device, and wherein the control circuit is configured to determine a test case to execute, determine, based on the test case to execute, the product identifier, cause presentation, on the first display device, of the product identifier, transmit, to the electronic switch, a signal, wherein the signal mimics a pull of the trigger and causes the handheld scanner to read the product identifier, capture, from the second display device, an image, wherein the image includes at least a portion of the transaction record, and analyze the image to determine whether the transaction record includes a record associated with the product identifier.

In some embodiments, an apparatus and a corresponding method performed by the apparatus comprises determining, by an automated testing system, a test case to execute, determining, based on the test case to execute, a product identifier, presenting, via a first display device, the product identifier, transmitting, to an electronic switch incorporated with the handheld scanner, a signal, wherein the signal mimics a pull of a trigger of the handheld scanner and causes the handheld scanner to read the product identifier, transmitting, to the POS terminal, an indication of the product identifier, wherein the POS terminal is configured to present, via a second display device, a transaction record for a transaction at the POS terminal, and wherein the POS terminal is further to, in response to receipt of the indication of the product identifier, update the transaction record to include an record associated with the product identifier, capturing, by the automated testing system, an image of the second display device, wherein the image includes at least a portion of the transaction record, and analyzing, by the automated testing system, whether the transaction record includes the record associated with the product identifier.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for automated testing of transactions at a point-of-sale (POS) terminal, the system comprising:
   a handheld scanner, wherein the handheld scanner includes an electronic switch, wherein the electronic switch is electrically coupled to a physical trigger of the handheld scanner, and wherein the handheld scanner is configured to read a product identifier;
   a first display device, wherein the first display device is configured to present the product identifier;
   the POS terminal, wherein the POS terminal includes a second display device, wherein the second display device is configured to present a transaction record for a transaction at the POS terminal; and
   a control circuit, wherein the control circuit is communicatively coupled to the handheld scanner, the first display device, and the second display device, and wherein the control circuit is configured to:
      determine a test case to execute;
      determine, based on the test case to execute, the product identifier;
      cause presentation, on the first display device, of the product identifier;
      transmit, to the electronic switch, a signal, wherein the signal mimics a pull of the trigger and causes the handheld scanner to read the product identifier;
      capture, from the second display device, an image, wherein the image includes at least a portion of the transaction record updated by the POS terminal in response to receipt of an indication of the product identifier from the handheld scanner;
      analyze the image, via one or more of optical character recognition (OCR) and image recognition, to determine whether the transaction record includes a record associated with the product identifier;
      retransmit, to the electronic switch, the signal when it is determined, based on the analysis of the image, that the transaction record does not include the record associated with the product identifier; and
      log, in a database, an indication of success for the test case when it is determined, based on the analysis of the image, that the transaction record does include the record associated with the product identifier.

2. The system of claim 1, wherein the control circuit is further configured to:
   after retransmission of the signal to the electronic switch, capture, from the second display device, a second image;
   determine, based on an analysis of the second image, that the transaction record does not include a record associated with the product identifier; and
   perform one of,
      cashing out the transaction;
      voiding the transaction; and
      causing the POS terminal to reboot.

3. The system of claim 1, wherein the electronic switch is a transistor.

4. The system of claim 1, wherein the test case is one of a general merchandise item, an age restricted item, an item with which a service contract is associated, a linked transaction, and a coupon transaction.

5. The system of claim 1, wherein the record associated with the product identifier is a line item on the transaction record.

6. The system of claim 1, wherein the handheld scanner is further configured to:
   transmit, after reading the product identifier, an indication of the product identifier to the POS terminal.

7. The system of claim 6, wherein the POS terminal is further configured to:
   in response to receipt of the indication of the product identifier from the handheld scanner, update the transaction record to include the record associated with the product identifier.

8. A method for automated testing of transaction at a point-of-sale (POS) terminal, the method comprising:
   determining, by an automated testing system, a test case to execute;
   determining, based on the test case to execute, a product identifier;
   presenting, via a first display device, the product identifier;
   transmitting, to an electronic switch incorporated with a handheld scanner, a signal, wherein the signal mimics a pull of a trigger of the handheld scanner and causes the handheld scanner to read the product identifier;
   capturing, by the automated testing system, an image of a second display device of the POS terminal, wherein the image includes at least a portion of a transaction record updated by the POS terminal in response to receipt of an indication of the product identifier from the handheld scanner;
   analyzing the image, by the automated testing system via one or more of optical character recognition (OCR) and image recognition, to determine whether the transaction record includes the record associated with the product identifier;
   retransmitting, to the electronic switch, the signal when it is determined, based on the analysis of the image, that the transaction record does not include the record associated with the product identifier; and
   logging, in a database, an indication of success for the test case when it is determined, based on the analysis of the image, that the transaction record does include the record associated with the product identifier.

9. The method of claim 8 further comprising:
   after retransmitting the signal to the electronic switch, capturing, from the second display device, a second image;
   determining, based on an analysis of the second image, that the transaction record does not include a record associated with the product identifier; and
   performing one of,
      cashing out the transaction;
      voiding the transaction; and
      causing the POS terminal to reboot.

10. The method of claim 8, wherein the electronic switch is a transistor.

11. The method of claim 8, wherein the test case is one of a general merchandise item, an age restricted item, an item with which a service contract is associated, a linked transaction, and a coupon transaction.

12. The method of claim 8, wherein the record associated with the product identifier is a line item on the transaction record.

\* \* \* \* \*